(12) United States Patent
Hosokawa et al.

(10) Patent No.: US 10,520,746 B2
(45) Date of Patent: Dec. 31, 2019

(54) LENS DRIVING DEVICE HAVNG A MOVABLE ELEMENT AND A FIRST COLUMN PORTION CONFIGURED TO LIMIT A RANGE OF THE MOVABLE ELEMENT

(71) Applicant: TDK CORPORATION, Tokyo (JP)

(72) Inventors: Masahiro Hosokawa, Tokyo (JP); Naoki Yusa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 108 days.

(21) Appl. No.: 15/791,877

(22) Filed: Oct. 24, 2017

(65) Prior Publication Data

US 2018/0113323 A1    Apr. 26, 2018

(30) Foreign Application Priority Data

Oct. 26, 2016    (JP) .................................. 2016-209719

(51) Int. Cl.
*G02B 27/64*    (2006.01)
*G02B 7/02*    (2006.01)

(52) U.S. Cl.
CPC ............. *G02B 27/646* (2013.01); *G02B 7/02* (2013.01)

(58) Field of Classification Search
CPC ........ G02B 7/04; G02B 27/64; G02B 27/646; H04N 5/23248; H04N 5/23264; H04N 5/2328; H04N 5/23287

USPC ......... 359/554, 557; 250/201.1, 201.2, 201.4
See application file for complete search history.

(56) References Cited

U.S. PATENT DOCUMENTS

| 6,160,959 | A | * | 12/2000 | Mizumoto | ............... | G03B 5/00 396/52 |
| 7,554,075 | B2 | * | 6/2009 | Tanaka | ................. | G02B 27/646 250/216 |
| 8,218,016 | B2 | * | 7/2012 | Park | ....................... | G03B 17/00 348/208.11 |
| 2006/0092285 | A1 | * | 5/2006 | Shin | ..................... | H04N 5/2253 348/208.7 |

FOREIGN PATENT DOCUMENTS

JP    2009-093001 A    4/2009

* cited by examiner

*Primary Examiner* — Arnel C Lavarias
(74) *Attorney, Agent, or Firm* — Oliff PLC

(57) ABSTRACT

A lens driving device includes a first column portion rising from a base member toward a movable element side and configured to limit a moving range of the movable element moved by a piezoelectric actuator, and a case covering the base member so as to accommodate the movable element, the piezoelectric actuator, a lens carrier, and a column portion. The first column portion abuts on an inner surface of the case.

6 Claims, 16 Drawing Sheets

LENS DRIVING DEVICE HAVNG A MOVABLE ELEMENT AND A FIRST COLUMN PORTION CONFIGURED TO LIMIT A RANGE OF THE MOVABLE ELEMENT

CROSS-REFERENCE TO RELATED APPLICATIONS

The disclosure is based upon and claims the benefit of priority from Japanese Patent Application No. 2016-209719 filed on Oct. 26, 2016, the entire contents of which are incorporated herein by reference.

TECHNICAL FIELD

The present disclosure relates to a lens driving device.

BACKGROUND

Conventionally, as one type of a lens driving device used for an imaging apparatus mounted on a mobile phone or the like, lens drive devices adopting a smooth impact drive mechanism ("SIDM" is a registered trademark) are known. A lens driving device adopting the smooth impact drive mechanism is disclosed in, for example, Japanese Unexamined Patent Publication No. 2009-93001. In the lens driving device disclosed in Japanese Unexamined Patent Publication No. 2009-93001, a camera shake correction function is realized by moving a lens unit in a direction orthogonal to an optical axis direction, with a piezoelectric actuator using a smooth impact drive mechanism.

SUMMARY

In a lens driving device, a case covers a base member so as to accommodate a lens unit provided on the base member. When an external impact is applied to the lens driving device, the case may be detached due to deformation of the case. Further, it is assumed that the deformation of the case causes a direct impact to be applied to a movable element of the lens unit via the case. This causes transmission of the external impact via the movable element to the piezoelectric actuator configured to move the movable element, resulting in deformation or the like of the piezoelectric actuator. This may interfere with achievement of a stable movement of the movable element. For this reason, in the field of the lens driving device, it is desired to achieve a stable movement with resistance to external impacts.

In view of the above, an object of one aspect of the present disclosure is to provide a lens driving device capable of achieving a stable movement with resistance to external impacts.

One aspect of the present disclosure is a lens driving device for driving a lens. The lens driving device includes a base member; a movable element arranged to be stacked on the base member in a direction of an optical axis of the lens, and movable with respect to the base member; a piezoelectric actuator having a piezoelectric element, and configured to move the movable element in a direction orthogonal to the direction of the optical axis of the lens by expanding and contracting the piezoelectric element; a lens carrier arranged to be stacked on the movable element, on an opposite side to a side provided with the base member in the direction of the optical axis of the lens, and capable of holding the lens; a first column portion rising from the base member toward the movable element side, and configured to limit a moving range of the movable element moved by the piezoelectric actuator; and a case covering the base member so as to accommodate the movable element, the piezoelectric actuator, the lens carrier, and the column portion. In the lens driving device, the first column portion abuts on an inner surface of the case.

In this lens driving device, the first column portion configured to limit the moving range of the movable element abuts on the case covering the base member. That is, the first column portion serves both as a function of regulating the moving range of the movable element, and a function of receiving an external impact. Therefore, when an external impact is applied to the case, the impact is received by the first column portion abutting on the case. This can suppress deformation of the case. In addition, since the first column portion receives the impact, the external impact is not directly applied to the movable element. This eliminates transmission of the external impact via the movable element to the piezoelectric actuator configured to move the movable element, and can suppress deformation or the like of the piezoelectric actuator. Therefore, even when an external impact is applied, the movable element can be stably moved by the piezoelectric actuator. Thus, the lens driving device is capable of achieving a stable movement with resistance to external impacts.

The first column portion may regulate a rotation of the movable element around an axis along the direction of the optical axis of the lens as a rotation axis. In this case, since the first column portion also functions to regulate the rotation of the movable element, it is possible to regulate the rotation of the movable element with a simple configuration without adding another member to regulate the rotation of the movable element.

A first end part of the piezoelectric actuator may be fixed to the first column portion, and a second end part may be engaged with the movable element to move the movable element. In this case, since the first column portion also functions to fix the piezoelectric actuator, it is possible to fix the piezoelectric actuator with a simple configuration without adding another member to fix the piezoelectric actuator.

The lens driving device may further include a second column portion rising from the base member toward the movable element side, and configured to regulate a rotation of the movable element around the axis along the direction of the optical axis of the lens as a rotation axis. Then, the second column portion may abut on an inner surface of the case. In this case, the rotation of the movable element can be regulated by the second column portion. Further, since the first column portion and the second column portion abut on the case, it is possible to further suppress deformation of the case when an external impact is applied.

The first end part of the piezoelectric actuator may be fixed to the second column portion, and the second end part may be engaged with the movable element to move the movable element. In this case, since the second column portion configured to regulate the rotation of the movable element also functions to fix the piezoelectric actuator, it is possible to fix the piezoelectric actuator with a simple configuration without adding another member to fix the piezoelectric actuator.

The lens driving device may further include a third column portion rising from the base member toward the movable element side, and abutting on the inner surface of the case. Then, the first end part of the piezoelectric actuator may be fixed to the third column portion, and the second end part may be engaged with the movable element to move the movable element. In this case, the piezoelectric actuator can be fixed by the third column portion. Further, since the third column portion also abuts on the case, it is possible to further suppress deformation of the case when an external impact is applied.

According to one aspect of the present disclosure, it is possible to achieve a stable movement with resistance to external impacts.

DETAILED DESCRIPTION

Figure 1:
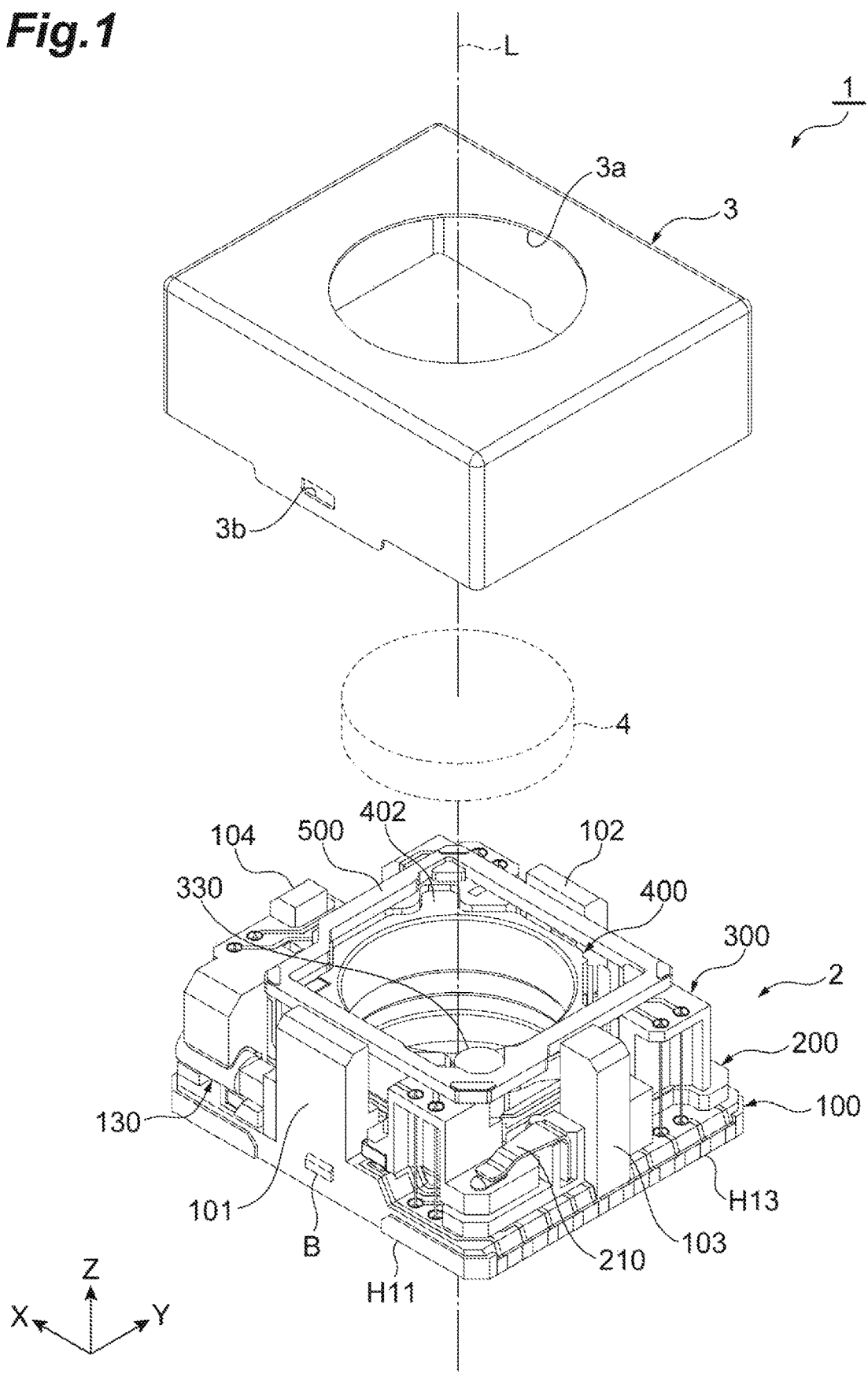
FIG. 1 is an exploded perspective view showing an internal configuration of a lens driving device according to an embodiment.

Hereinafter, an embodiment of the present disclosure will be described with reference to the drawings. In the description of the drawings, the same elements are denoted by the same reference numerals, and duplicate descriptions are omitted.

Figure 2:
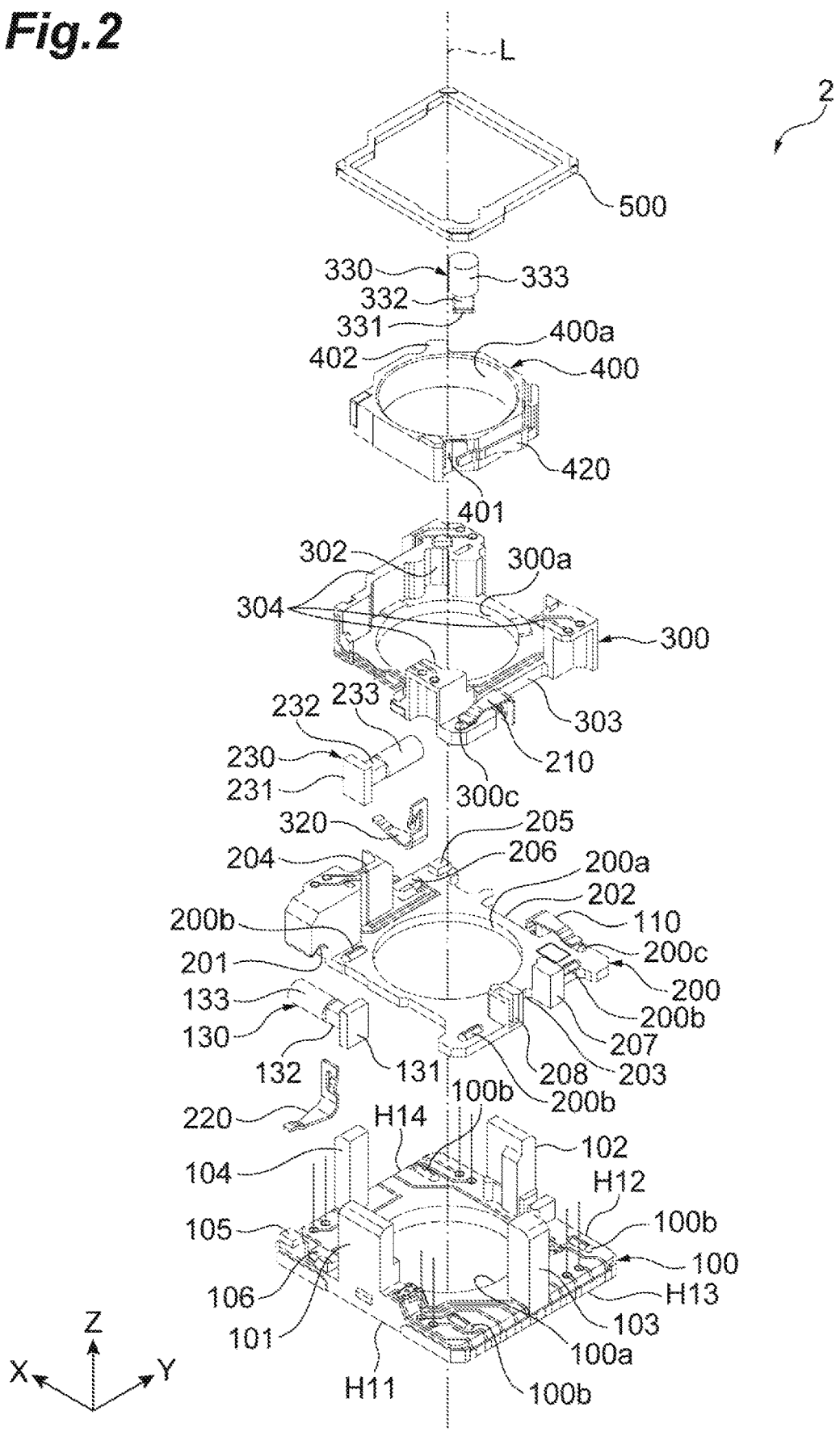
FIG. 2 is an exploded perspective view of a lens driving part of FIG. 1.

A lens driving device 1 shown in FIGS. 1 and 2 is mounted on an imaging apparatus such as a digital camera for example, and drives a lens 4. A lens driving device 1 includes a lens driving part 2 and a case 3. The lens driving device 1 has an optical axis L of a lens 4 to be mounted on the lens driving part 2.

For convenience of description, each figure shows an XYZ orthogonal coordinate system. The Z-axis direction is a direction of the optical axis L of the lens 4 to be mounted. The X-axis direction is orthogonal to the direction of the optical axis L. The Y-axis direction is orthogonal to the direction of the optical axis L and orthogonal to the X-axis direction.

The lens driving part 2 includes a base member 100, an X-axis movable element 200, a Y-axis movable element 300, a lens carrier 400, and a holding frame 500. The base member 100, the X-axis movable element 200, the Y-axis movable element 300, the lens carrier 400, and the holding frame 500 are arranged in this order along the direction of the optical axis L.

Specifically, the X-axis movable element 200 is arranged to be stacked on the base member 100 in the direction of the optical axis L. The Y-axis movable element 300 is arranged to be stacked on the X-axis movable element 200, on an opposite side to a side provided with the base member 100 (the side where the base member 100 is stacked) in the direction of the optical axis L. The lens carrier 400 is arranged to be stacked on the Y-axis movable element 300, on an opposite side to a side provided with the X-axis movable element 200 (the side where the X-axis movable element 200 is stacked) in the direction of the optical axis L.

The X-axis movable element 200 is supported by the base member 100 to be relatively movable with respect to the base member 100 in the X-axis direction. The Y-axis movable element 300 is supported by the X-axis movable element 200 to be relatively movable with respect to the X-axis movable element 200 in the Y-axis direction. The lens carrier 400 is supported by the Y-axis movable element 300 to be relatively movable with respect to the Y-axis movable element 300 in the direction of the optical axis L.

First, details around the base member 100 will be described. As shown in FIG. 2, the base member 100 is a substantially rectangular plate member having four corners when viewed along the direction of the optical axis L. For convenience of description, individual four edges constituting an outer peripheral edge of the base member 100 when viewed along the direction of the optical axis L are referred to as an edge H11, an edge H12, an edge H13, and an edge H14. The edge H11 and the edge H12 are parallel and extend along the X-axis direction. The edge H13 and the edge H14 are parallel and extend along the Y-axis direction. When the base member 100 is viewed along the direction of the optical axis L, individual edges are connected in the order of the edge H11, the edge H14, the edge H12, and the edge H13 to form the outer peripheral edge.

The base member 100 is provided with a circular opening 100a centered on the optical axis L. The base member 100 is provided with a plurality of projections 100b, on a surface on a side stacked with the X-axis movable element 200. A top of the projection 100b has a substantially arcuate cross section along the Y-axis direction. The projection 100b extends in a band shape along the X-axis direction. Note that the projection 100b is not limited to extending in the band shape, but may be substantially hemispherical.

The lens driving part 2 further includes a first support column (third column portion) 101, a second support column (first column portion) 102, a third support column (second column part) 103, and a fourth support column (second column portion) 104. The first support column 101 to the fourth support column 104 are provided on the base member 100, on the surface on the side stacked with the X-axis movable element 200, and rising from the base member 100 toward the X-axis movable element 200 side. The first support column 101 to the fourth support column 104 are provided on an edge portion of the base member 100.

In detail, the first support column 101 is provided at a substantially intermediate position of the edge H11 at the edge portion on the edge H11 side of the base member 100. The second support column 102 is provided at a substantially intermediate position of the edge H12 at the edge portion on the edge H12 side of the base member 100. The third support column 103 is provided at a substantially intermediate position of the edge H13 at the edge portion on the edge H13 side of the base member 100. The fourth support column 104 is provided at a substantially intermediate position of the edge H14 at the edge portion on the edge H14 side of the base member 100.

Figure 3:
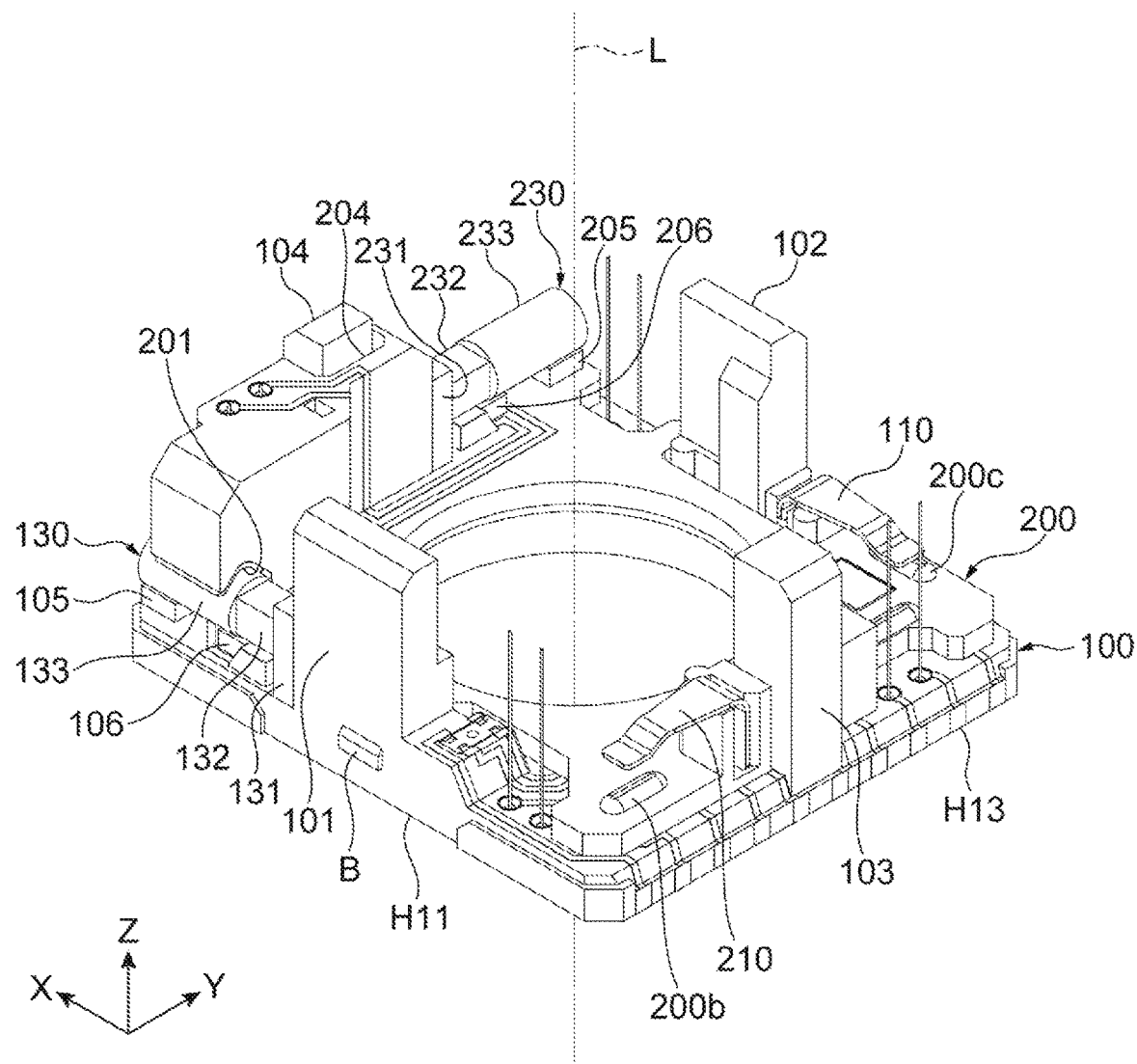
FIG. 3 is a perspective view showing a state in which a base member and an X-axis movable element are combined.

As shown in FIGS. 2 and 3, the lens driving part 2 further includes an X-axis piezoelectric actuator 130. The X-axis piezoelectric actuator 130 is an actuator constituting a smooth impact drive mechanism. The X-axis piezoelectric actuator 130 has a piezoelectric element, and moves the X-axis movable element 200 in the X-axis direction by expanding and contracting the piezoelectric element. In detail, the X-axis piezoelectric actuator 130 includes a weight part 131, an X-axis piezoelectric element 132, and an X-axis drive shaft 133.

The X-axis piezoelectric element 132 is an element capable of expanding and contracting in the X-axis direction. The X-axis piezoelectric element 132 is made of a piezoelectric material. The X-axis drive shaft 133 is formed in a columnar shape, and arranged such that an axis of the column extends along the X-axis direction. The X-axis drive shaft 133 is fixed to a first end part of the X-axis piezoelectric element 132 in the expansion/contraction direction. The weight part 131 is fixed to a second end part of the X-axis piezoelectric element 132 in the expansion/contraction direction.

A first end part (an end part on the weight part 131 side) of the X-axis piezoelectric actuator 130 is fixed to a surface on the edge H14 side of the first support column 101. The X-axis piezoelectric actuator 130 extends from the surface on the edge H14 side of the first support column 101, toward the edge H14 side along the X-axis direction. A second end part (an end part on the X-axis drive shaft 133 side) of the X-axis piezoelectric actuator 130 is engaged with the X-axis movable element 200 to move the X-axis movable element 200 in the X-axis direction.

The base member 100 is provided with a first projection 105 and a second projection 106 at a portion facing the X-axis drive shaft 133 of the X-axis piezoelectric actuator 130. The first projection 105 and the second projection 106 slidably abut on a surface on the base member 100 side of the X-axis drive shaft 133, to support the X-axis drive shaft 133.

Next, details of a configuration of the X-axis movable element 200 and details of a supporting configuration of the X-axis movable element 200 by the base member 100 will be described. As shown in FIG. 2, the X-axis movable element 200 is a substantially rectangular plate member having four corners when viewed along the direction of the optical axis L. The X-axis movable element 200 is provided with a circular opening 200a centered on the optical axis L.

The X-axis movable element 200 is provided with escape portions 202, 203, and 204 to avoid interference with the second support column 102, the third support column 103, and the fourth support column 104, when stacked on the base member 100. The escape portions 202 to 204 have a shape in which the outer peripheral edge of the X-axis movable element 200 is recessed toward inside (the opening 200a side).

The X-axis movable element 200 is provided with rising portions 207 and 208 rising toward the Y-axis movable element 300 side, on a surface on a side stacked with the Y-axis movable element 300. The rising portions 207 and 208 are provided at positions where the escape portion 203 is sandwiched between the rising portion 207 and the rising portion 208 in the Y-axis direction.

The X-axis movable element 200 has an X-axis friction engagement part 201 frictionally engaged with the X-axis drive shaft 133 of the X-axis piezoelectric actuator 130. In the X-axis friction engagement part 201, a surface abutting on the X-axis drive shaft 133 is V-shaped. Further, in the X-axis friction engagement part 201, a V-shaped metal plate is provided at a portion abutting on the X-axis drive shaft 133.

The X-axis movable element 200 is provided with a plurality of projections 200b, on a surface on a side stacked with the Y-axis movable element 300. A top of the projection 200b has a substantially arcuate cross section along the X-axis direction. The projection 200b extends in a band shape along the Y-axis direction. Note that the projection 200b is not limited to extending in the band shape, but may be substantially hemispherical.

As shown in FIGS. 2 and 3, the lens driving part 2 further includes a Y-axis piezoelectric actuator 230. The Y-axis piezoelectric actuator 230 is an actuator constituting the smooth impact drive mechanism. The Y-axis piezoelectric actuator 230 has a piezoelectric element, and moves the Y-axis movable element 300 in the Y-axis direction by expanding and contracting the piezoelectric element. In detail, the Y-axis piezoelectric actuator 230 includes a weight part 231, a Y-axis piezoelectric element 232, and a Y-axis drive shaft 233.

The Y-axis piezoelectric element 232 is an element capable of expanding and contracting in the Y-axis direction. The Y-axis piezoelectric element 232 is made of a piezoelectric material. The Y-axis drive shaft 233 is formed in a columnar shape, and arranged such that an axis of the column extends along the Y-axis direction. The Y-axis drive shaft 233 is fixed to a first end part of the Y-axis piezoelectric element 232 in the expansion/contraction direction. The weight part 231 is fixed to a second end part of the Y-axis piezoelectric element 232 in the expansion/contraction direction.

A first end part (an end part on the weight part 231 side) of the Y-axis piezoelectric actuator 230 is fixed to a rising wall portion provided around the escape portion 204 of the X-axis movable element 200. The Y-axis piezoelectric actuator 230 extends from a part fixed with the X-axis movable element 200 along the Y-axis direction. A second end part (an end part on the Y-axis drive shaft 233 side) of the Y-axis piezoelectric actuator 230 is engaged with the Y-axis movable element 300 to move the Y-axis movable element 300 in the Y-axis direction.

The X-axis movable element 200 is provided with a first projection 205 and a second projection 206, at a portion facing the Y-axis drive shaft 233 of the Y-axis piezoelectric actuator 230. The first projection 205 and the second projection 206 slidably abut on a surface on the X-axis movable element 200 side of the Y-axis drive shaft 233, to support the Y-axis drive shaft 233.

Next, a state in which the X-axis movable element 200 is stacked on the base member 100 will be described. As shown in FIGS. 3 to 7, with the X-axis movable element 200 stacked on the base member 100, the projection 100b of the base member 100 abuts on the surface on the base member 100 side of the X-axis movable element 200. As shown in FIG. 7, when viewed along the direction of the optical axis L, the second support column 102 is fitted into the recessed escape portion 202. Similarly, the third support column 103 is fitted into the escape portion 203. The fourth support column 104 is fitted into the escape portion 204. The X-axis friction engagement part 201 abuts on a surface of the X-axis drive shaft 133, opposite to the base member 100. That is, the X-axis drive shaft 133 is located closer to the base member 100 than the X-axis friction engagement part 201.

Figure 5:
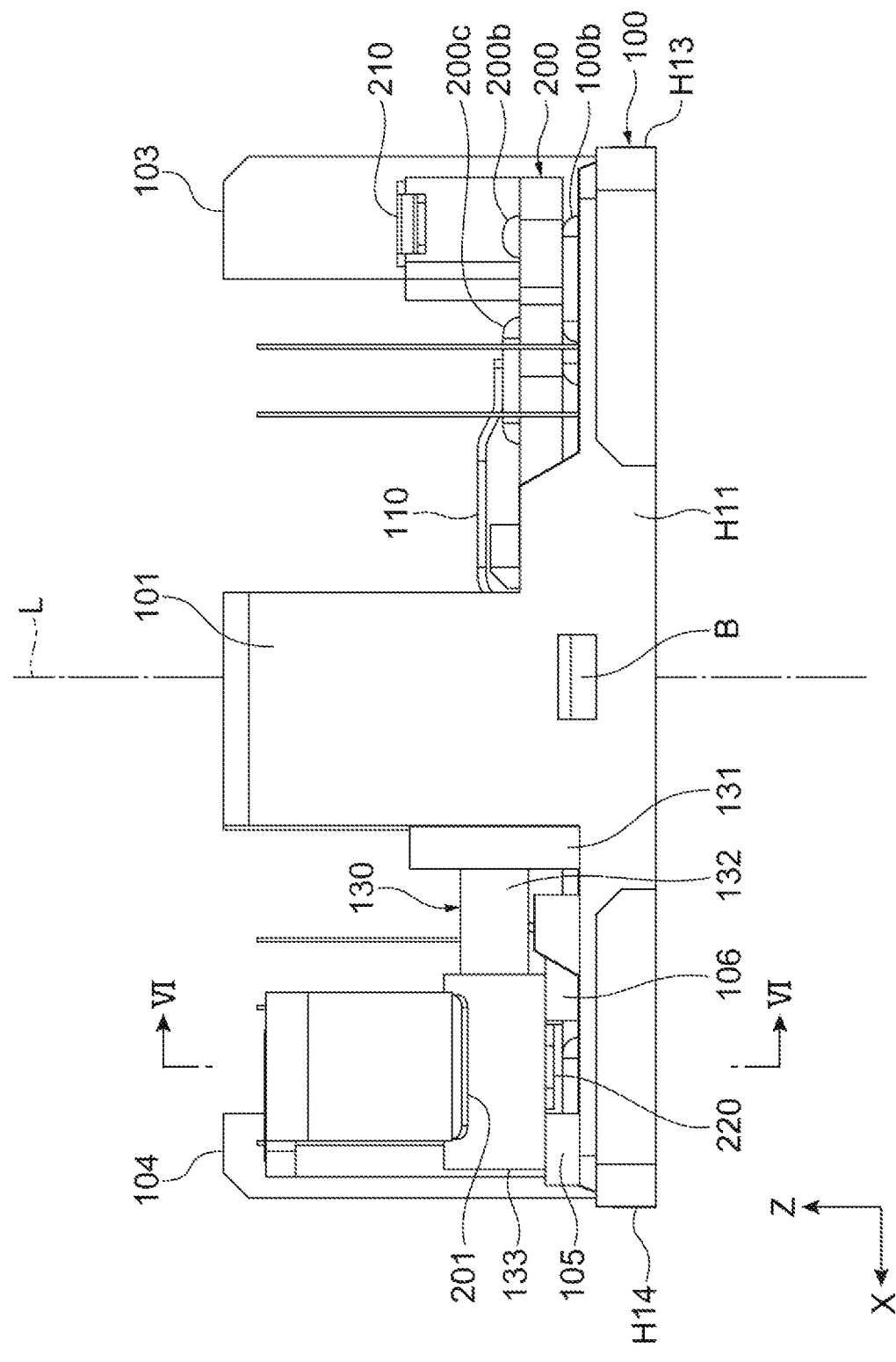
FIG. 5 is a side view of a state in which the base member and the X-axis movable element are combined, as viewed from a first column portion side.
Figure 6:
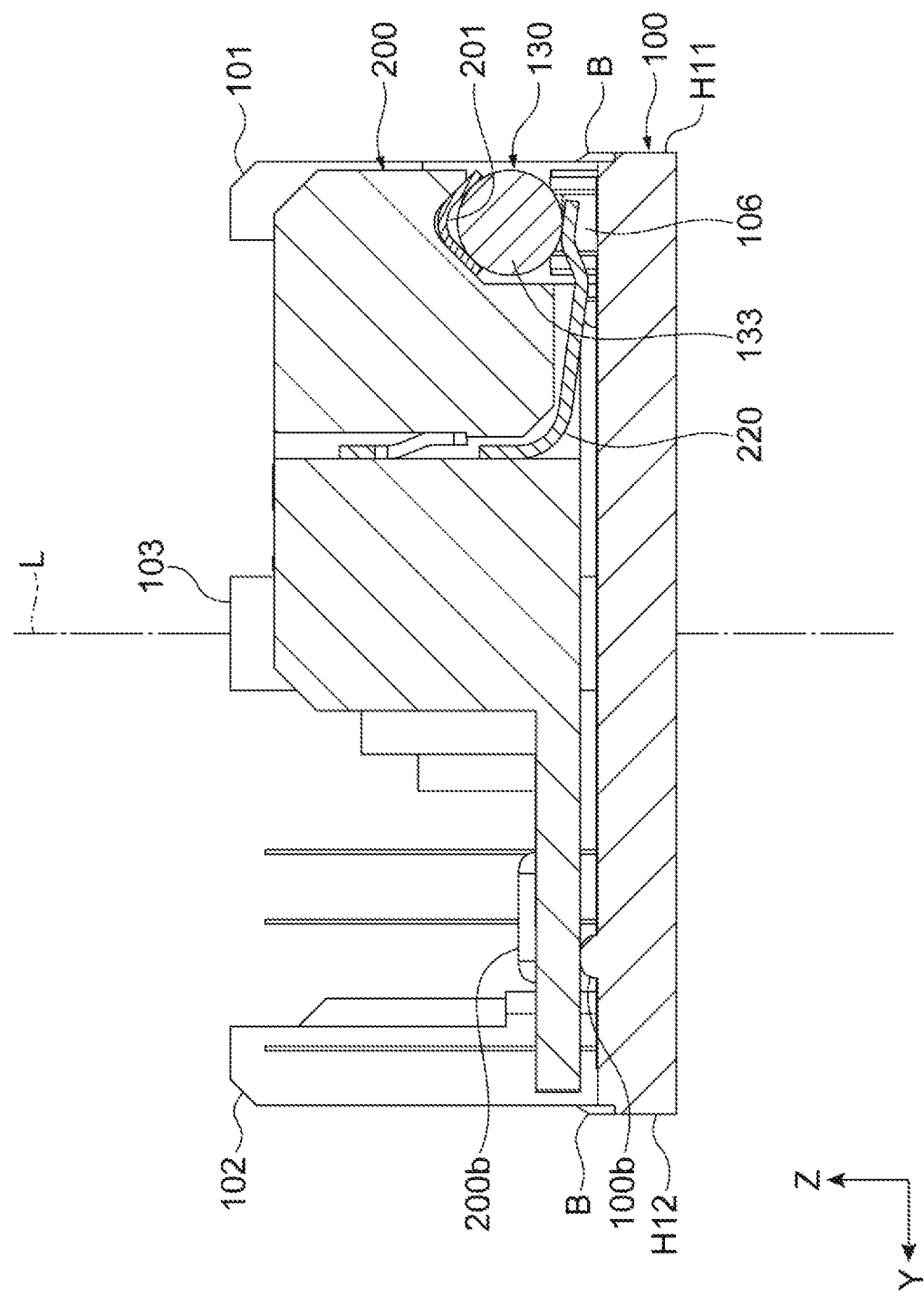
FIG. 6 is a cross-sectional view taken along line VI-VI of FIG. 5.
Figure 7:
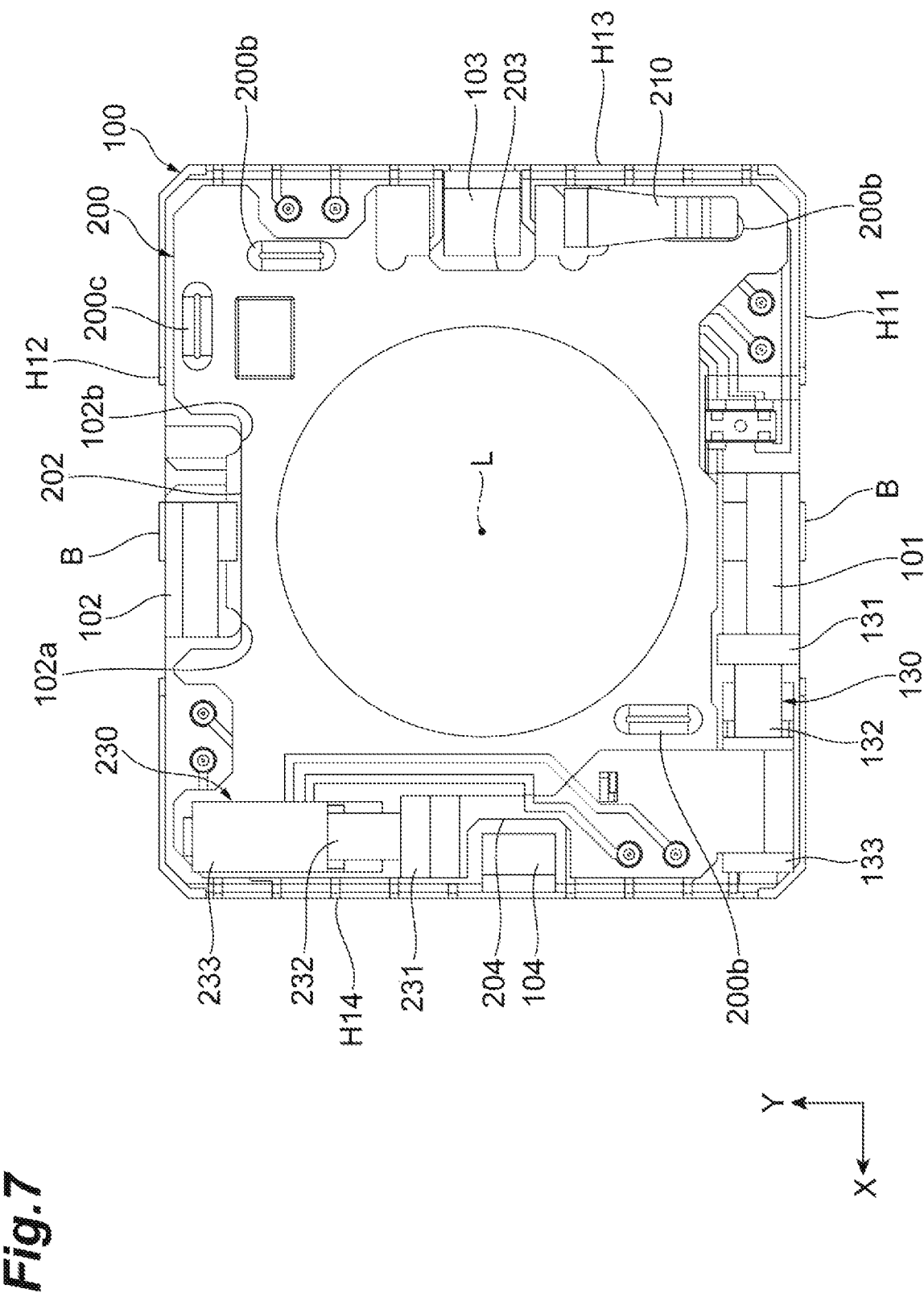
FIG. 7 is a plan view of a state in which the base member and the X-axis movable element are combined, as viewed from the X-axis movable element side.

Additionally, as shown in FIGS. 2, 5 and 6, the X-axis movable element 200 is mounted with a second urging part 220 having a first end part fixed to the X-axis movable element 200, and a second end part abutting on the X-axis drive shaft 133 of the X-axis piezoelectric actuator 130. The second urging part 220 has elasticity. The second end part of the second urging part 220 abuts on the X-axis drive shaft 133, between the first projection 105 and the second projection 106. By abutting on the X-axis drive shaft 133, the second urging part 220 urges the X-axis drive shaft 133 toward the X-axis movable element 200 side. That is, the second urging part 220 presses the X-axis friction engagement part 201 against the X-axis drive shaft 133. Accordingly, the X-axis drive shaft 133 is sandwiched between the second urging part 220 and the X-axis friction engagement part 201.

This causes the X-axis friction engagement part 201 to be frictionally engaged with an outer peripheral surface of the X-axis drive shaft 133 of the X-axis piezoelectric actuator 130. The X-axis piezoelectric element 132 expands and contracts in the X-axis direction while the X-axis friction engagement part 201 is frictionally engaged with the X-axis drive shaft 133 of the X-axis piezoelectric actuator 130, causing the X-axis movable element 200 to move in the X-axis direction.

Figure 4:
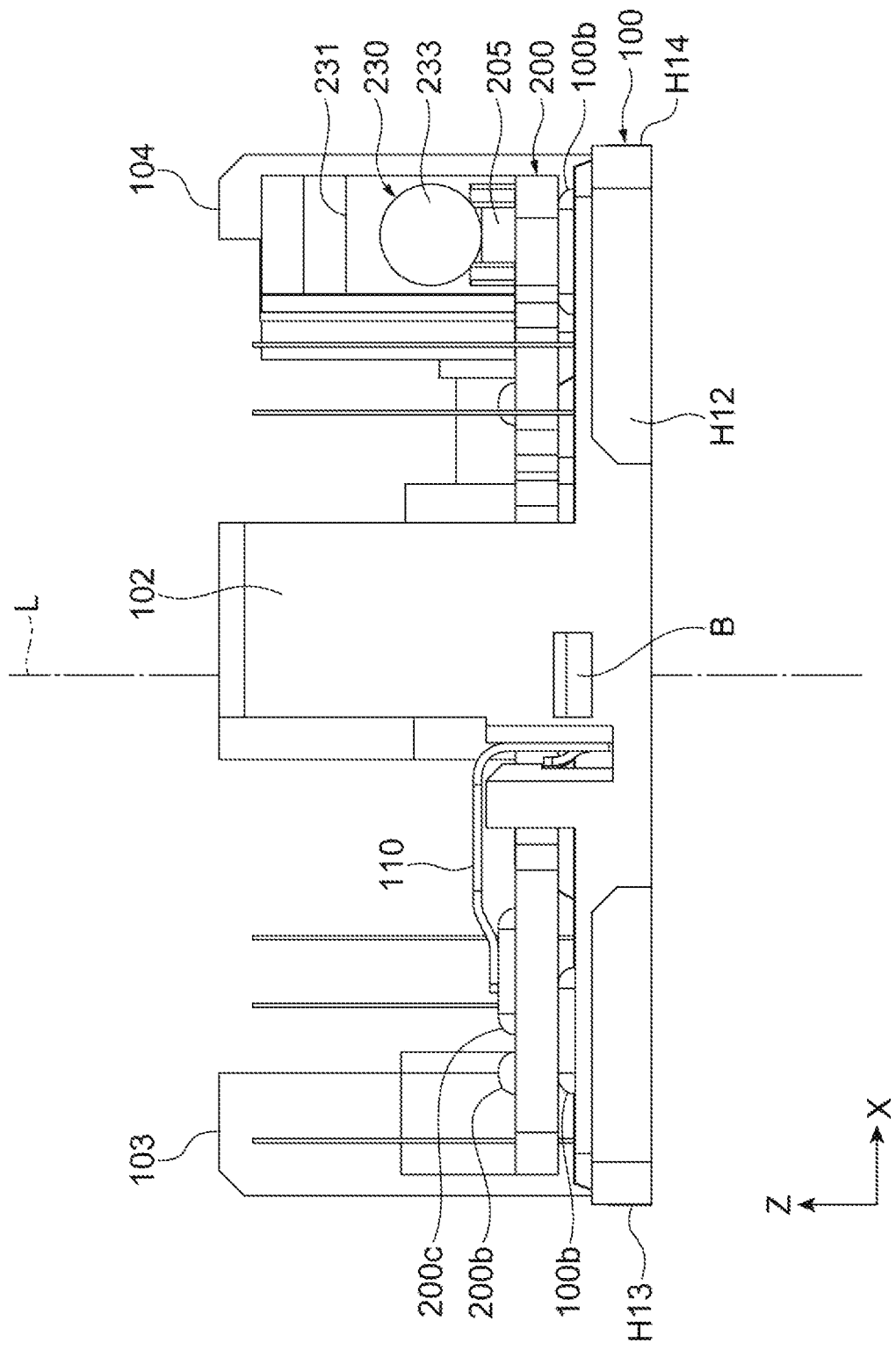
FIG. 4 is a side view of a state in which the base member and the X-axis movable element are combined, as viewed from a second column portion side.

Further, as shown in FIGS. 3 and 4, the base member 100 is provided with a first urging part 110 having a first end part fixed to a base of the second support column 102 rising from the base member 100, and a second end part abutting on a surface of the X-axis movable element 200, on the side stacked with the Y-axis movable element 300. The first urging part 110 has elasticity. The first urging part 110 urges the X-axis movable element 200 toward the base member 100 side by abutting on the X-axis movable element 200.

A projection 200c is provided at an abutting part of the X-axis movable element 200 with the first urging part 110. A top of the projection 200c has a substantially arcuate cross section along the Y-axis direction. The projection 200c extends in a band shape along the X-axis direction. Note that the projection 200c is not limited to extending in the band shape, but may be substantially hemispherical.

In addition, as shown in FIG. 4 and the like, a position of at least one of the plurality of projections 100b provided on the base member 100 substantially coincides with a position of the projection 200c provided on the X-axis movable element 200 in the direction of the optical axis L. Thus, when the X-axis movable element 200 is urged by the first urging part 110, an urging force of the first urging part 110 is received by the projection 100b that substantially coincides with a region where the first urging part 110 urges the X-axis movable element 200, in the direction of the optical axis L. This can inhibit tilting of the X-axis movable element 200 with respect to the base member 100.

The first urging part 110 mounted on the base member 100 is opposed to the second urging part 220 mounted on the X-axis movable element 200 with the optical axis L interposed in between, when viewed along the direction of the optical axis L.

In this way, as shown in FIG. 6, the X-axis drive shaft 133 of the X-axis piezoelectric actuator 130 fixed to the first support column 101 is sandwiched between the X-axis friction engagement part 201 and the second urging part 220, and the first urging part 110 urges the X-axis movable element 200, suppressing floating of the X-axis movable element 200 with respect to the base member 100.

Here, when a force in a direction to separate the X-axis movable element 200 from the base member 100 is applied to the X-axis movable element 200, deflecting of the second urging part 220 can suppress deformation of the X-axis piezoelectric actuator 130 (X-axis piezoelectric element 132).

As shown in FIG. 7, when viewed along the direction of the optical axis L, the second support column 102 is located in the escape portion 202 of the X-axis movable element 200. In order to illustrate around the escape portion 202, FIG. 7 shows a state in which the first urging part 110 is removed. An inner wall surface of the escape portion 202 and an end part of the second support column 102 in the X-axis direction are facing each other in the X-axis direction. The second support column 102 is formed such that the end part of the second support column 102 in the X-axis direction abuts on the inner wall surface of the escape portion 202, when the X-axis movable element 200 moves in the X-axis direction. Thus, the second support column 102 has a function of limiting the moving range of the X-axis movable element 200 moved by the X-axis piezoelectric actuator 130.

The second support column 102 may be provided with projections 102a and 102b protruding toward the opening 100a side. A line connecting a top of the projection 102a and a top portion of the projection 102b is along the X-axis direction. The second support column 102 may guide a movement of the X-axis movable element 200 along the X-axis direction by abutting the projections 102a and 102b to the inner wall surface of the escape portion 202 of the X-axis movable element 200. Thus, when the projections 102a and 102b are provided on the second support column 102, it is possible to suppress a rotation of the X-axis movable element 200 with an axis along the direction of the optical axis L (the axis parallel to the optical axis L) as the rotation axis.

Further, as shown in FIG. 7, when viewed along the direction of the optical axis L, the third support column 103 is located in the escape portion 203 of the X-axis movable element 200. Similarly, the fourth support column 104 is located in the escape portion 204 of the X-axis movable element 200. This makes it possible to suppress a rotation of the X-axis movable element 200 with the axis along the direction of the optical axis L (the axis parallel to the optical axis L) as the rotation axis, by the third support column 103 and the fourth support column 104. In the X-axis direction, between the third support column 103 and the escape portion 203, and between the fourth support column 104 and the escape portion 204, a predetermined clearance is provided so as not to obstruct a movement of the X-axis movable element 200 in the X-axis direction by the X-axis piezoelectric actuator 130.

Next, details of a configuration of the Y-axis movable element 300 and details of a supporting configuration of the Y-axis movable element 300 by the X-axis movable element 200 will be described. As shown in FIG. 2, the Y-axis movable element 300 is a substantially rectangular plate member having four corners when viewed along the direction of the optical axis L. The Y-axis movable element 300 is provided with a circular opening 300a centered on the optical axis L.

The Y-axis movable element 300 is provided with an escape portion 303 to avoid interference with the rising portions 207 and 208, when stacked on the X-axis movable element 200. The escape portion 303 has a shape in which an outer peripheral edge of the Y-axis movable element 300 is recessed toward inside (the opening 300a side).

Figure 9:
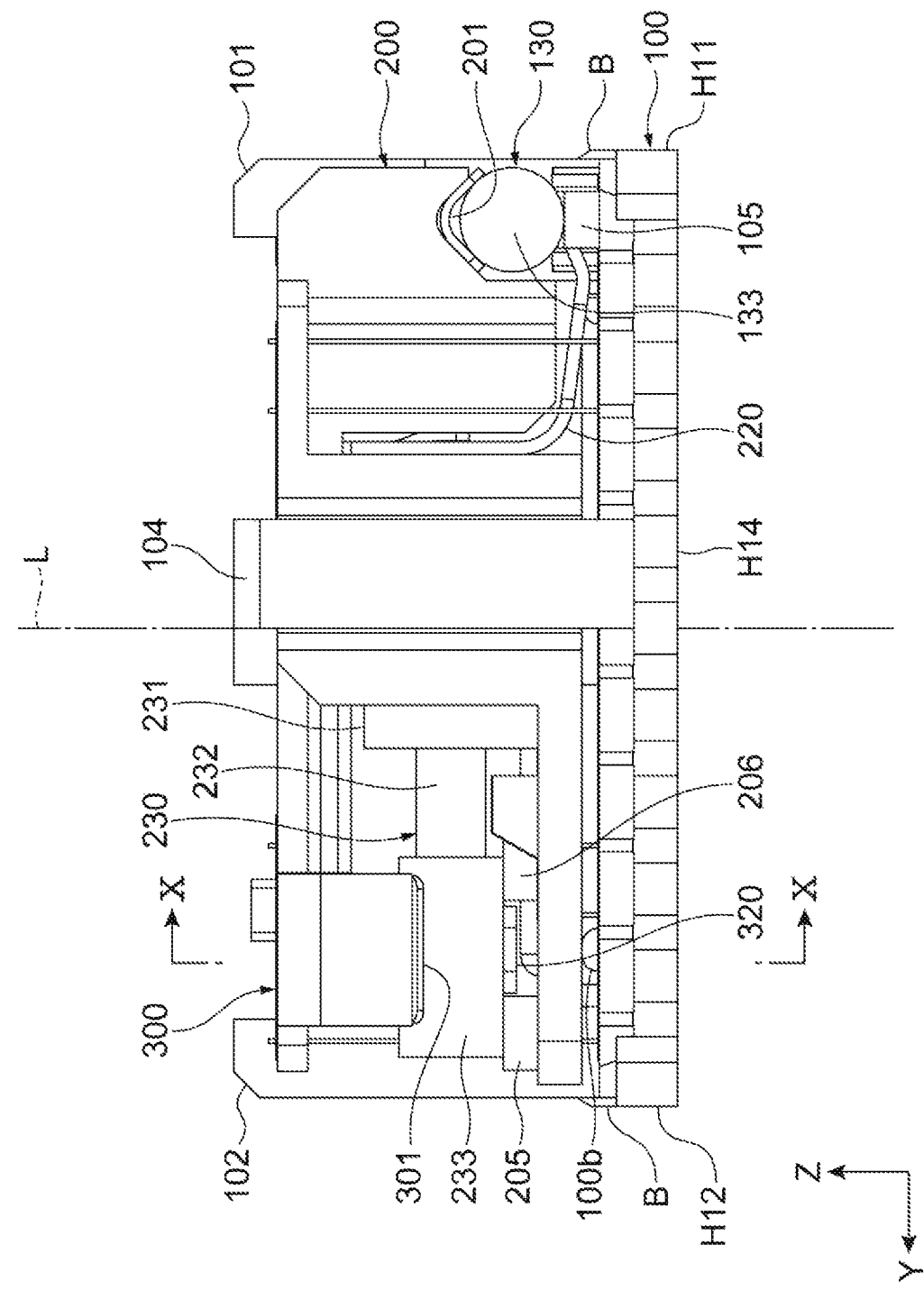
FIG. 9 is a side view of a state in which the base member, the X-axis movable element, and the Y-axis movable element are combined, as viewed from a fourth column portion side.
Figure 10:
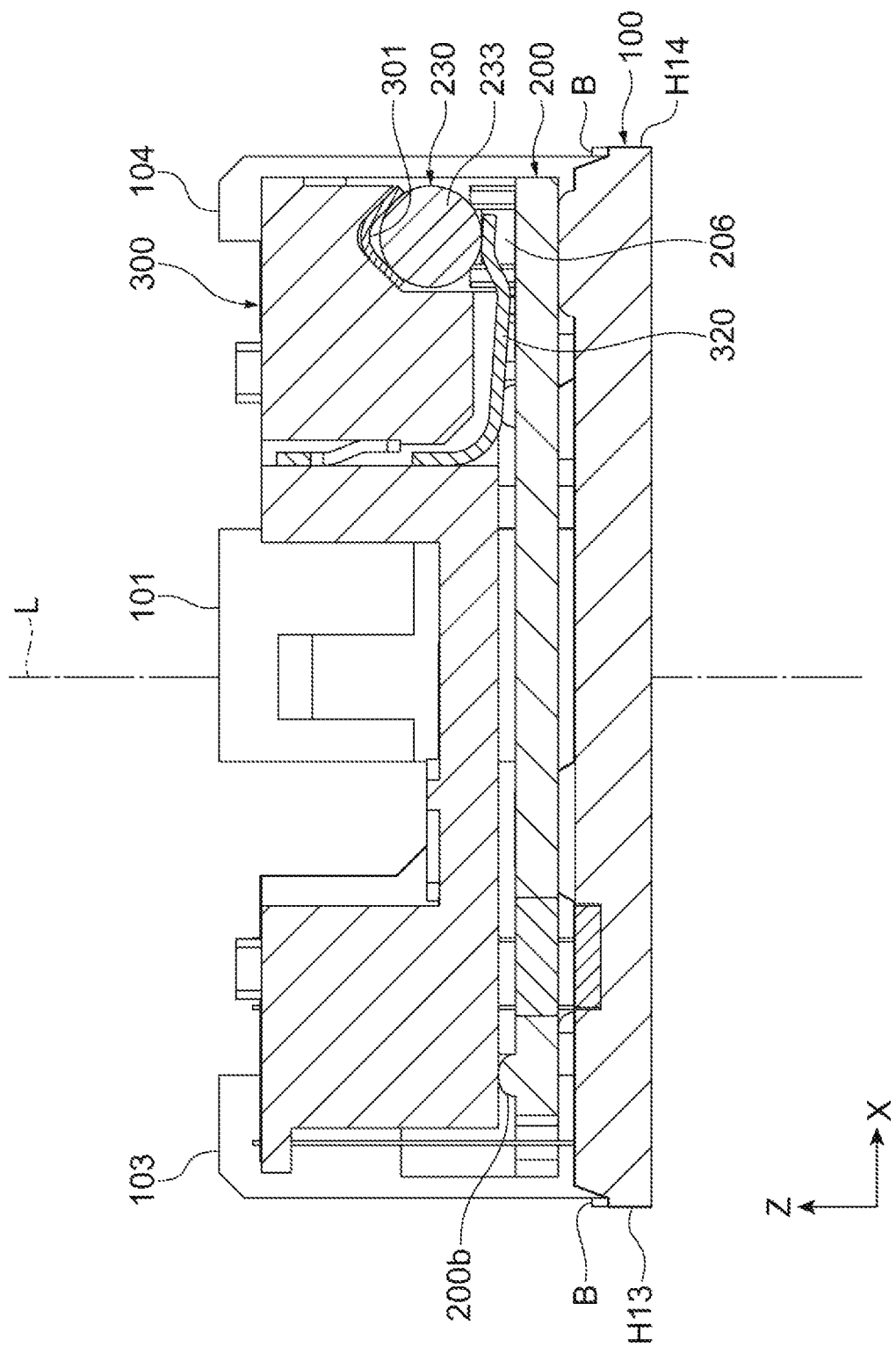
FIG. 10 is a cross-sectional view taken along line X-X of FIG. 9.

As shown in FIGS. 9 and 10, the Y-axis movable element 300 has a Y-axis friction engagement part 301 frictionally engaged with the Y-axis drive shaft 233 of the Y-axis piezoelectric actuator 230. In the Y-axis friction engagement part 301, a surface abutting on the Y-axis drive shaft 233 is V-shaped. Further, in the Y-axis friction engagement part 301, a V-shaped metal plate is provided at a portion abutting on the Y-axis drive shaft 233.

Figure 11:
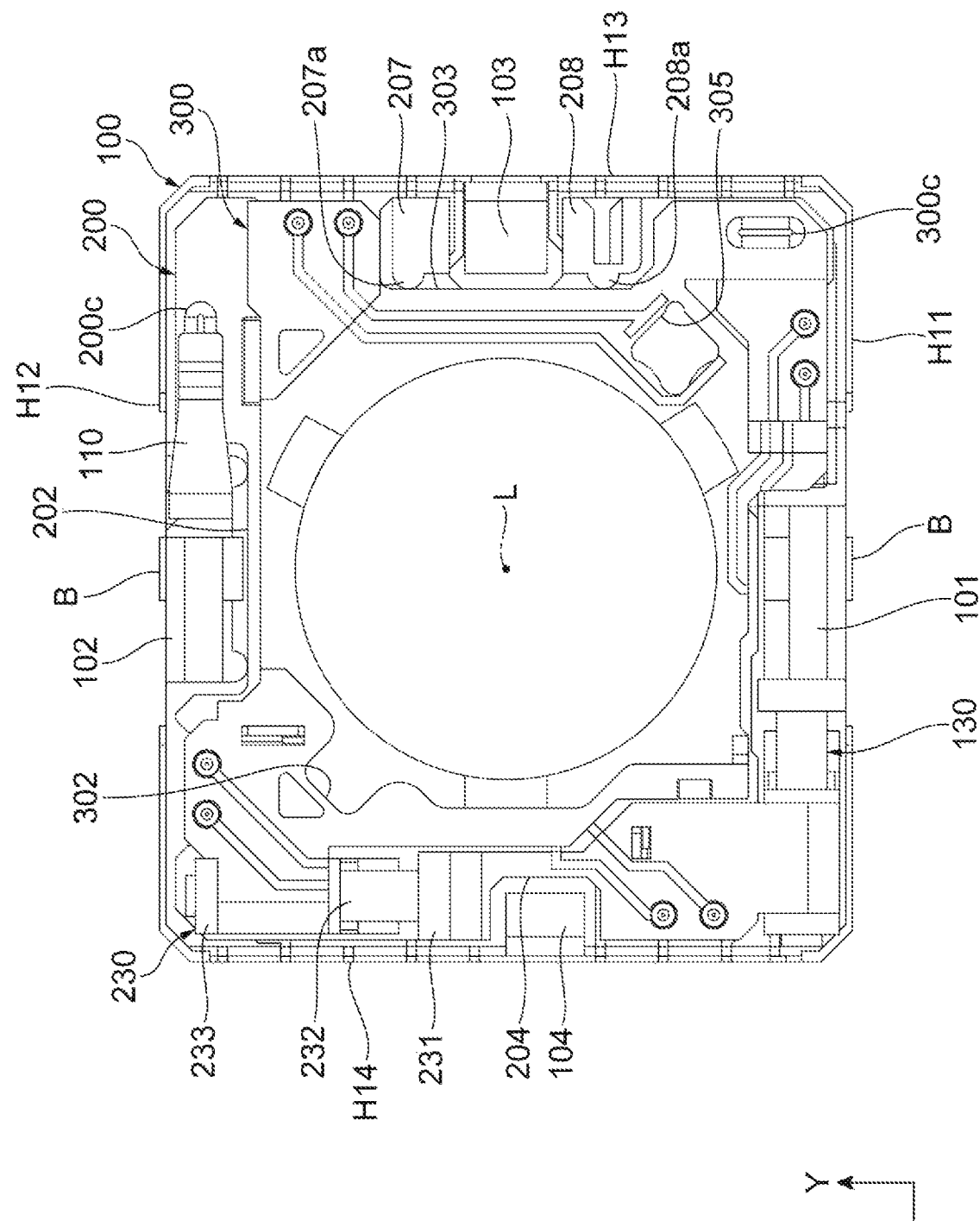
FIG. 11 is a plan view of a state in which the base member, the X-axis movable element, and the Y-axis movable element are combined, as viewed from the Y-axis movable element side.

Next, a state in which the Y-axis movable element 300 is stacked on the X-axis movable element 200 will be described. As shown in FIGS. 8 to 11, with the Y-axis movable element 300 stacked on the X-axis movable element 200, the projection 200b of the X-axis movable element 200 abuts on a surface on the X-axis movable element 200 side of the Y-axis movable element 300. As shown in FIG. 11, when viewed along the direction of the optical axis L, the rising portion 207, the rising portion 208, and the third support column 103 are fitted into the recessed escape portion 303. The Y-axis friction engagement part 301 abuts on a surface of the Y-axis drive shaft 233, on an opposite side to the X-axis movable element 200. That is, the Y-axis drive shaft 233 is located closer to the X-axis movable element 200 than the Y-axis friction engagement part 301.

Additionally, as shown in FIGS. 2, 9 and 10, the Y-axis movable element 300 is mounted with a fourth urging part 320 having a first end part fixed to the Y-axis movable element 300, and a second end part abutting on the Y-axis drive shaft 233 of the Y-axis piezoelectric actuator 230. The fourth urging part 320 has elasticity. The second end part of the fourth urging part 320 abuts on the Y-axis drive shaft 233, between the first projection 205 and the second projection 206. The fourth urging part 320 urges the Y-axis drive shaft 233 toward the Y-axis movable element 300 side, by abutting on the Y-axis drive shaft 233. That is, the fourth urging part 320 presses the Y-axis friction engagement part 301 against the Y-axis drive shaft 233. Accordingly, the Y-axis drive shaft 233 is sandwiched between the fourth urging part 320 and the Y-axis friction engagement part 301.

This causes the Y-axis friction engagement part 301 to be frictionally engaged with an outer peripheral surface of the Y-axis drive shaft 233 of the Y-axis piezoelectric actuator 230. The Y-axis piezoelectric element 232 expands and contracts in the Y-axis direction while the Y-axis friction engagement part 301 is frictionally engaged with the Y-axis drive shaft 233 of the Y-axis piezoelectric actuator 230, causing the Y-axis movable element 300 to move in the Y-axis direction.

Figure 8:
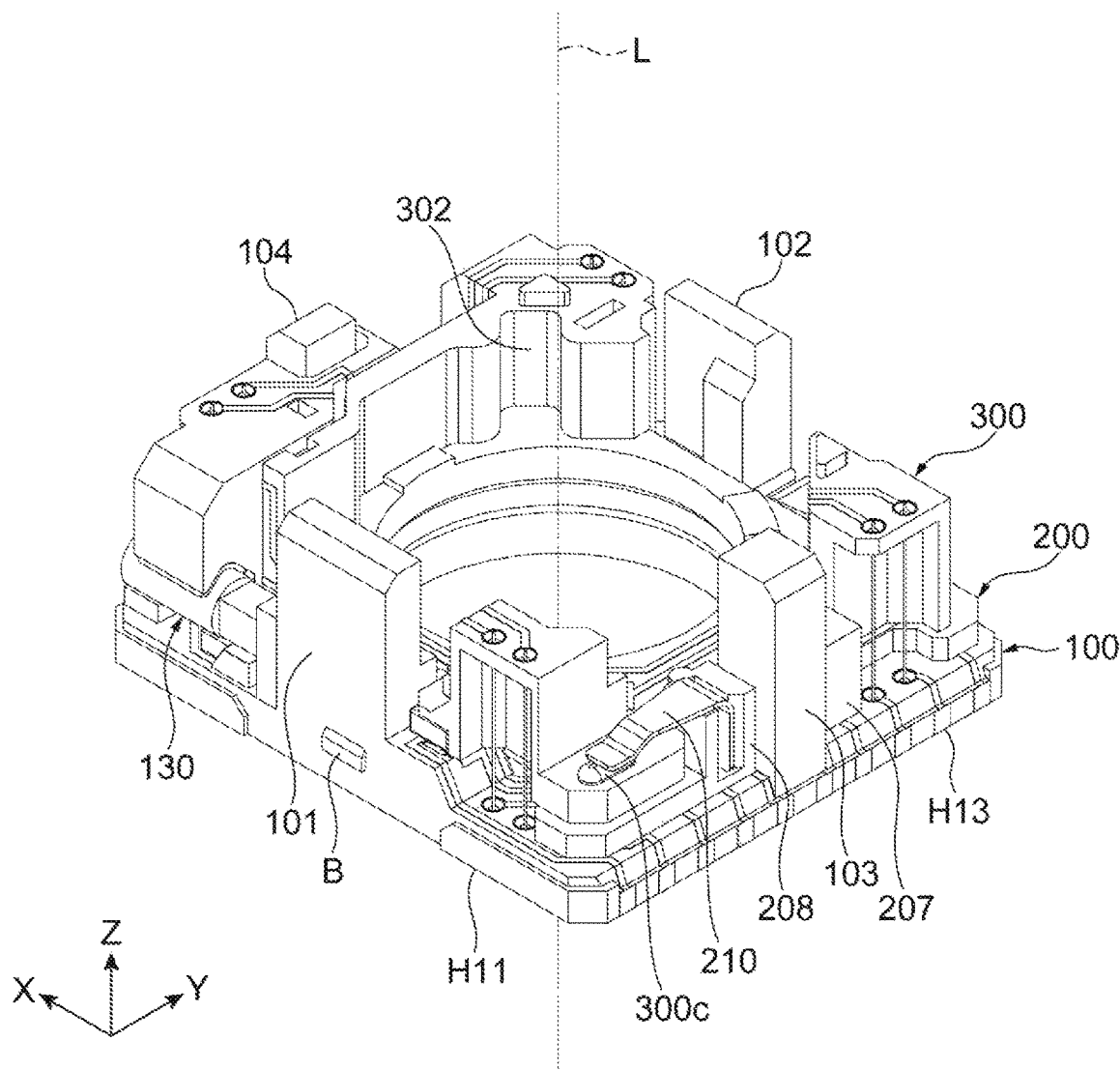
FIG. 8 is a perspective view showing a state in which the base member, the X-axis movable element, and a Y-axis movable element are combined.

Further, as shown in FIG. 8, the X-axis movable element 200 is provided with a third urging part 210 having a first end part fixed to the rising portion 208, and a second end part abutting on the surface of the Y-axis movable element 300, on a side stacked with the lens carrier 400. The third urging part 210 has elasticity. The third urging part 210 urges the Y-axis movable element 300 toward the X-axis movable element 200 side by abutting on the Y-axis movable element 300.

A projection 300c is provided at an abutting part of the Y-axis movable element 300 with the third urging part 210. A top of the projection 300c has a substantially arcuate cross section along the X-axis direction. The projection 300c extends in a band shape along the Y-axis direction. Note that the projection 300c is not limited to extending in the band shape, but may be substantially hemispherical.

In addition, as shown in FIGS. 3 and 8 and the like, a position of at least one of the plurality of projections 200b provided on the X-axis movable element 200 substantially coincides with a position of the projection 300c provided on the Y-axis movable element 300, in the direction of the optical axis L. Thus, when the Y-axis movable element 300 is urged by the third urging part 210, an urging force of the third urging part 210 is received by the projection 200b that substantially coincides with a region where the third urging part 210 urges the Y-axis movable element 300, in the direction of the optical axis L. This can inhibit tilting of the Y-axis movable element 300 with respect to the X-axis movable element 200.

The third urging part 210 mounted on the X-axis movable element 200 is opposed to the fourth urging part 320 mounted on the Y-axis movable element 300 with the optical axis L interposed in between, when viewed along the direction of the optical axis L.

Thus, the Y-axis drive shaft 233 of the Y-axis piezoelectric actuator 230 fixed to the X-axis movable element 200 is sandwiched between the Y-axis friction engagement part 301 and the fourth urging part 320, and the third urging part 210 urges the Y-axis movable element 300, suppressing floating of the Y-axis movable element 300 with respect to the X-axis movable element 200.

Here, when a force is applied to the Y-axis movable element 300 in a direction to separate from the X-axis movable element 200, deflecting of the fourth urging part 320 can suppress deformation of the Y-axis piezoelectric actuator 230 (Y-axis piezoelectric element 232).

As shown in FIG. 11, when viewed along the direction of the optical axis L, the rising portions 207 and 208 are located in the escape portion 303 of the Y-axis movable element 300. In order to illustrate around the escape portion 303, FIG. 11 shows a state in which the third urging part 210 is removed. An inner wall surface of the escape portion 303 faces the rising portions 207 and 208 in the Y-axis direction. The rising portions 207 and 208 are formed such that the rising portions 207 and 208 abut on the inner wall surface of the escape portion 303 when the Y-axis movable element 300 moves in the Y-axis direction. Thus, the rising portions 207 and 208 have a function of limiting the moving range of the Y-axis movable element 300 moved by the Y-axis piezoelectric actuator 230.

The rising portion 207 may be provided with a projection 207a protruding toward the opening 200a side. Similarly, the rising portion 208 may be provided with a projection 208a protruding toward the opening 200a side. A line connecting a top of the projection 207a and a top portion of the projection 208a is along the Y-axis direction. The rising portions 207 and 208 may guide a movement of the Y-axis movable element 300 along the Y-axis direction, by abutting the projections 207a and 208a to the inner wall surface of the escape portion 303 of the Y-axis movable element 300. Thus, when the projections 207a and 208a are provided on the rising portions 207 and 208 configured to limit the moving range of the Y-axis movable element 300, it is possible to suppress a rotation of the Y-axis movable element 300 with the axis (parallel axis) along the direction of the optical axis L as a rotation axis.

Next, details of a configuration of the lens carrier 400 and details of a supporting configuration of the lens carrier 400 by the Y-axis movable element 300 will be described. As shown in FIG. 2, the lens driving part 2 further includes a Z-axis piezoelectric actuator 330 configured to move the lens carrier 400. The Z-axis piezoelectric actuator 330 is an actuator constituting the smooth impact drive mechanism. The Z-axis piezoelectric actuator 330 has a piezoelectric element, and moves the lens carrier 400 in the direction of the optical axis L by expanding and contracting the piezoelectric element. In detail, the Z-axis piezoelectric actuator 330 includes a weight part 331, a Z-axis piezoelectric element 332, and a Z-axis drive shaft 333.

The Z-axis piezoelectric element 332 is an element capable of expanding and contracting in the direction of the optical axis L. The Z-axis piezoelectric element 332 is made of a piezoelectric material. The Z-axis drive shaft 333 is formed in a columnar shape, and arranged such that an axis of the column extends along the direction of the optical axis L. The Z-axis drive shaft 333 is fixed to a first end part of the Z-axis piezoelectric element 332 in the expansion/contraction direction. The weight part 331 is fixed to a second end part of the Z-axis piezoelectric element 332 in the expansion/contraction direction.

A first end part (an end part on the weight part 331 side) of the Z-axis piezoelectric actuator 330 is fitted and fixed in a concave mounting part 305 (see FIG. 11) provided on the Y-axis movable element 300. The Z-axis piezoelectric actuator 330 extends from a part fixed with the Y-axis movable element 300 along the direction of the optical axis L. A second end part (an end part on the Z-axis drive shaft 333 side) of the Z-axis piezoelectric actuator 330 is engaged with the lens carrier 400 to move the lens carrier 400 in the direction of the optical axis L.

Figure 12:
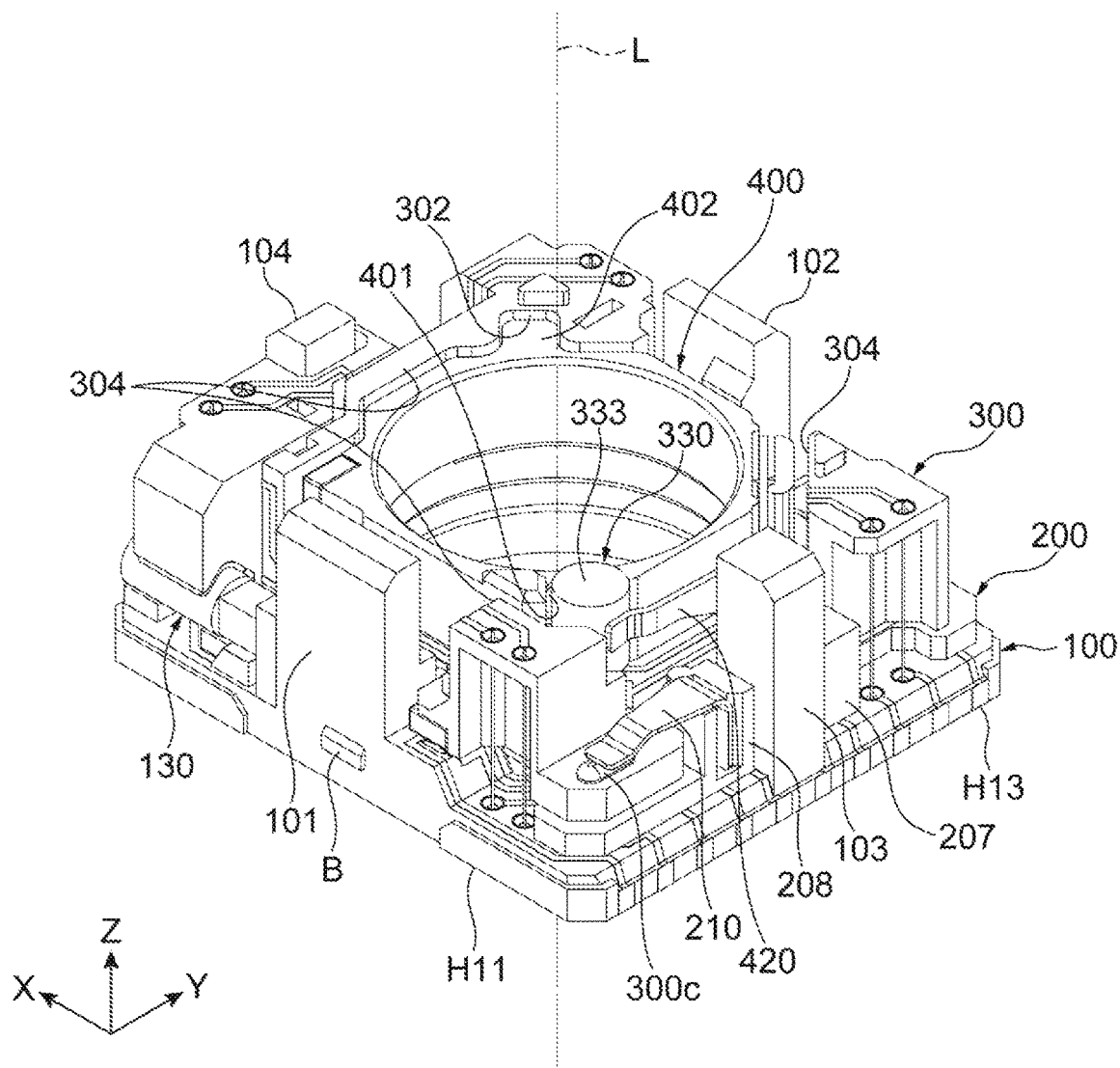
FIG. 12 is a perspective view showing a state in which the base member, the X-axis movable element, the Y-axis movable element, and the lens carrier are combined.

The lens carrier 400 is provided with a circular opening 400a centered on the optical axis L. On the opening 400a of the lens carrier 400, the lens 4 is mounted. That is, the lens carrier 400 can hold the lens 4. The lens 4 may be a lens unit formed by a plurality of lenses, or may be a single lens. As shown in FIGS. 2 and 12, the lens carrier 400 is arranged to be surrounded by a side wall portion 304 rising toward the lens carrier 400 side in the Y-axis movable element 300. The lens carrier 400 has a rotation-stopping projection 402. The rotation-stopping projection 402 is fitted into a cutout portion 302 provided on the side wall portion 304 of the Y-axis movable element 300. Fitting the rotation-stopping projection 402 into the cutout portion 302 suppresses the rotation of the lens carrier 400 with the optical axis L as a rotation axis.

Figure 13:
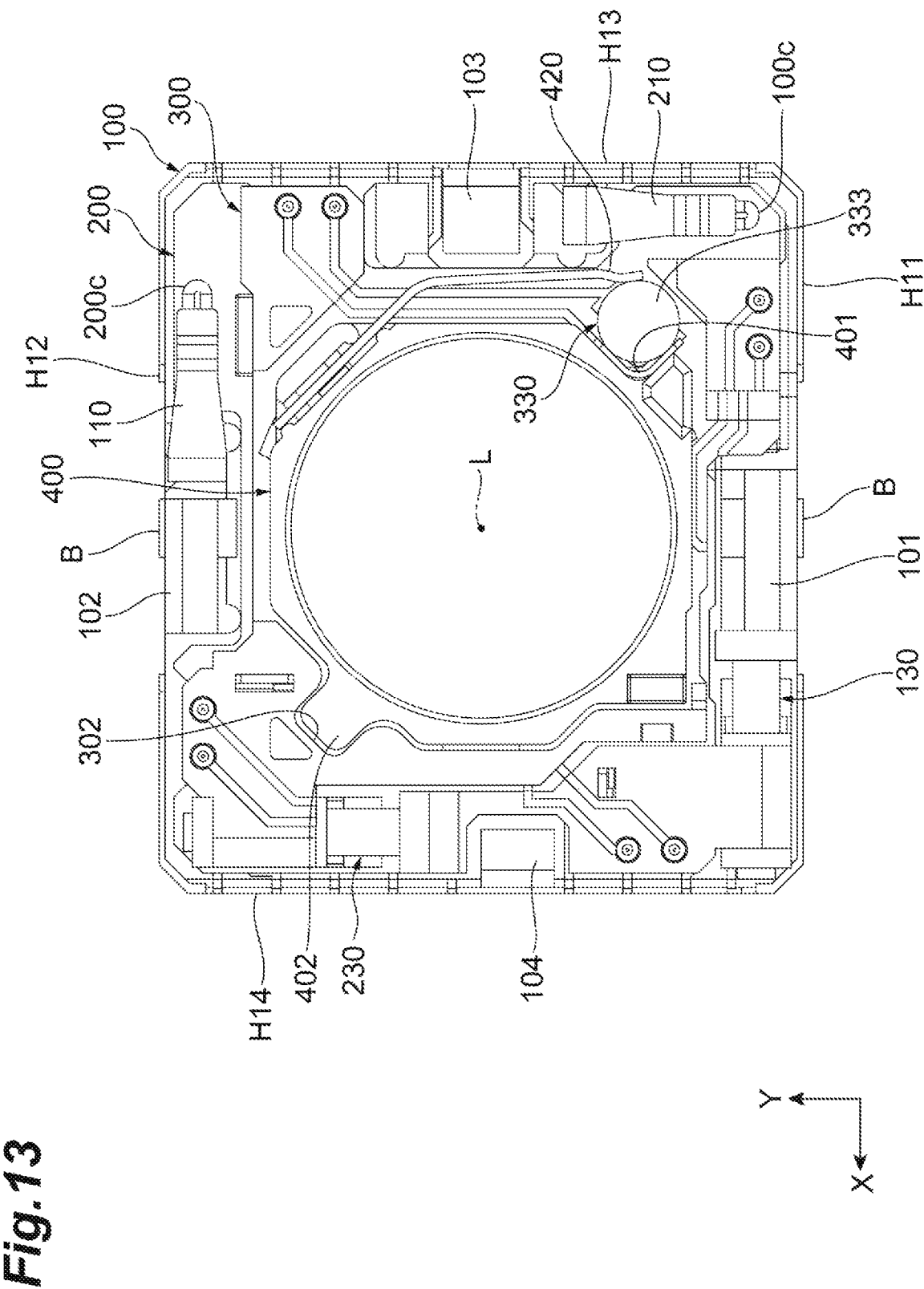
FIG. 13 is a plan view of a state in which the base member, the X-axis movable element, the Y-axis movable element, and the lens carrier are combined, as viewed from the lens carrier side.

As shown in FIGS. 12 and 13, the lens carrier 400 has a Z-axis friction engagement part 401 frictionally engaged with the Z-axis drive shaft 333 of the Z-axis piezoelectric actuator 330. In the Z-axis friction engagement part 401, a surface abutting on the Z-axis drive shaft 333 is V-shaped. Further, in the Z-axis friction engagement part 401, a V-shaped metal plate is provided at a portion abutting on the Z-axis drive shaft 333.

On an outer peripheral surface of the lens carrier 400, a retaining member 420 is mounted. The retaining member 420 has elasticity. A first end part of the retaining member 420 is fixed to the lens carrier 400, and a second end part abuts on the Z-axis drive shaft 333. The retaining member 420 urges the Z-axis drive shaft 333 toward the Z-axis friction engagement part 401 side. That is, the retaining member 420 presses the Z-axis friction engagement part 401 against the Z-axis drive shaft 333. Accordingly, the Z-axis drive shaft 333 is sandwiched between the retaining member 420 and the Z-axis friction engagement part 401.

This causes the Z-axis friction engagement part 401 to be frictionally engaged with an outer peripheral surface of the Z-axis drive shaft 333 of the Z-axis piezoelectric actuator 330. The Z-axis piezoelectric element 332 expands and contracts in the direction of the optical axis L while the Z-axis friction engagement part 401 is frictionally engaged with the Z-axis drive shaft 333 of the Z-axis piezoelectric actuator 330, causing the lens carrier 400 to move in the Z-axis direction.

Figure 14:
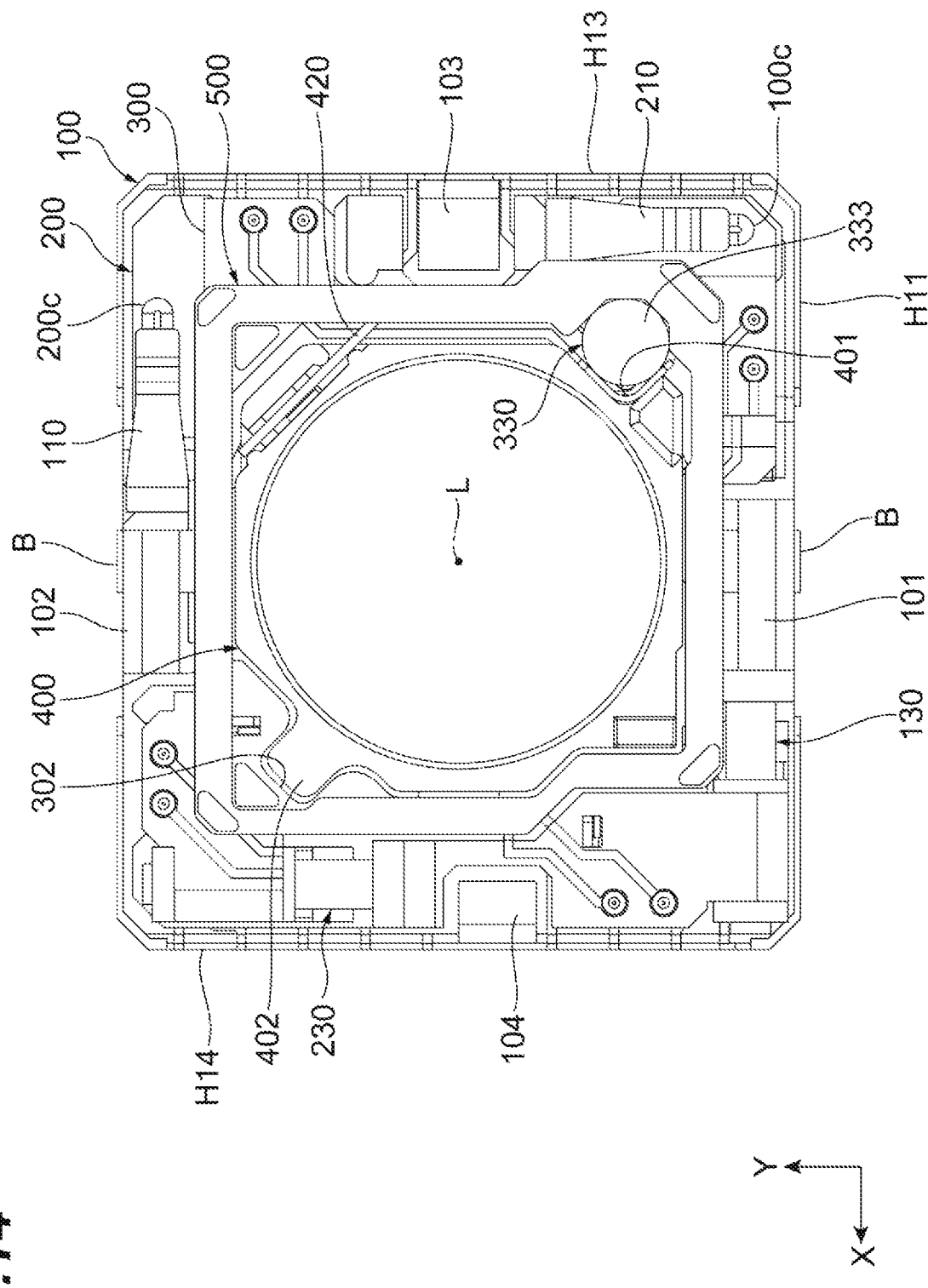
FIG. 14 is a plan view of a state in which the base member, the X-axis movable element, the Y-axis movable element, the lens carrier, and a holding frame are combined, as viewed from the holding frame side.

As shown in FIGS. 2 and 14, the holding frame 500 has a substantially rectangular frame shape surrounding the lens carrier 400, when viewed along the direction of the optical axis L. The holding frame 500 is mounted on a tip end part of the side wall portion 304 of the Y-axis movable element 300. An inner peripheral surface of a corner of the holding frame 500 abuts on the Z-axis drive shaft 333 of the Z-axis piezoelectric actuator 330. This causes the holding frame 500 to support an end part on the Z-axis drive shaft 333 side of the Z-axis piezoelectric actuator 330. Therefore, even when an external impact is applied, tilt of the Z-axis piezoelectric actuator 330 with respect to the Y-axis movable element 300 is suppressed.

Figure 15:
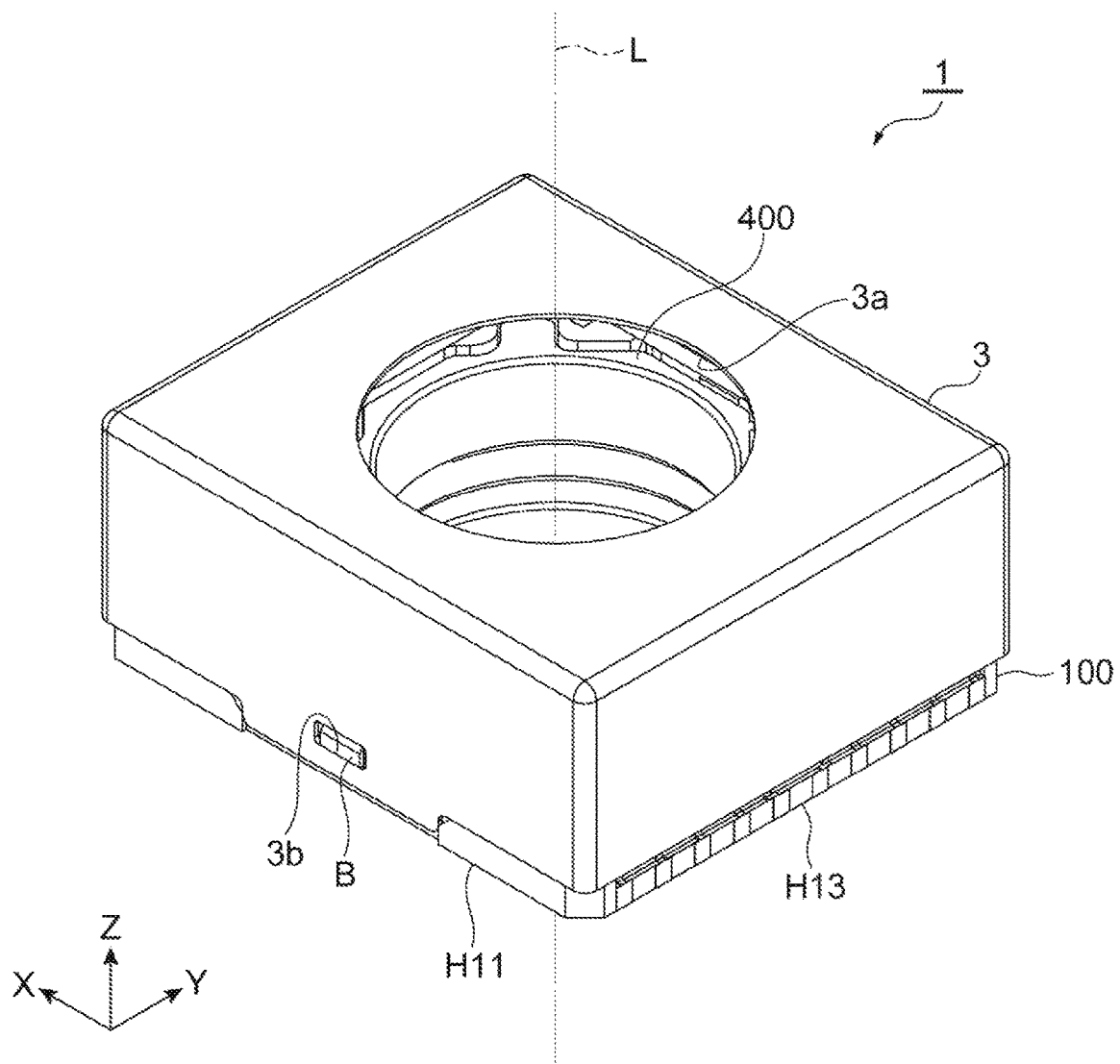
FIG. 15 is a perspective view showing the lens driving device in a state in which a case is mounted on the lens driving part.
Figure 16:
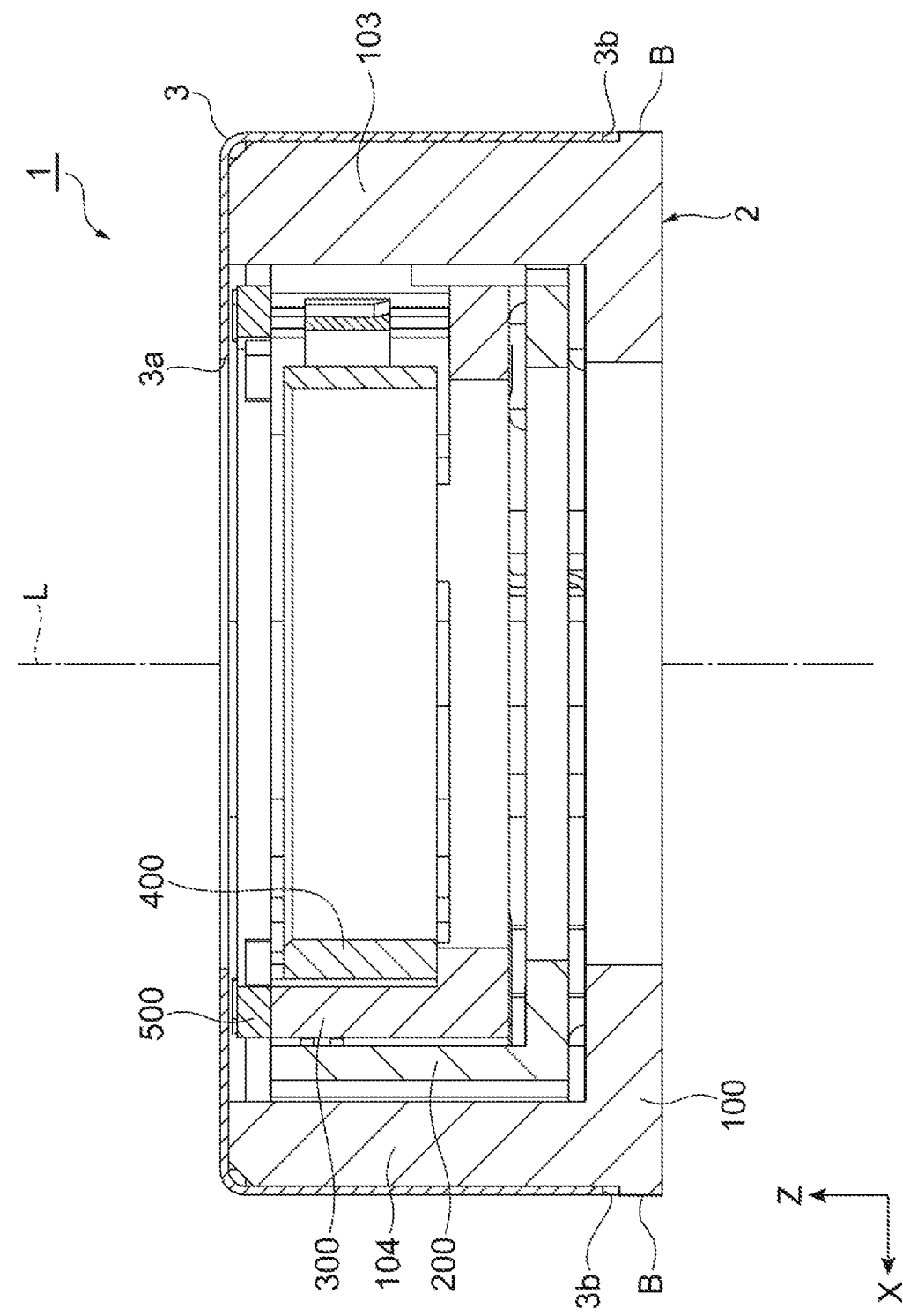
FIG. 16 is a cross-sectional view showing a state in which the lens driving device is cut along an X-axis direction.

Next, a configuration for mounting the case 3 to the lens driving part 2 will be described. As shown in FIGS. 15 and 16, the case 3 covers the base member 100 so as to accommodate components inside other than the base member 100, among the components constituting the lens driving part 2. As shown in FIGS. 1, 6, and the like, an engagement projection B is provided on each outer side surface of the first support column 101 and the second support column 102. The case 3 is provided with an engagement hole 3b at a position corresponding to the engagement projection B when covering the base member 100. Each engagement projection B of the first support column 101 and the second support column 102 is fitted into the engagement hole 3b of the case 3, causing the case 3 to be engaged with the engagement projection B. This allows the case 3 to be fixed to the lens driving part 2.

Further, as shown in FIG. 16, with the engagement projection B fitted into the engagement hole 3b, the inner surface of the case 3 abuts on a surface facing outward from the lens driving part 2, of the third support column 103 and a tip end part of the third support column 103, and on a surface facing outward from the lens driving part 2, of the fourth support column 104 and a tip end part of the fourth support column 104. Similarly, the inner surface of the case 3 abuts on a surface facing outward from the lens driving part 2, of the first support column 101 and a tip end part of the first support column 101, and on a surface facing outward from the lens driving part 2, of the second support column 102 and a tip end part of the second support column 102. Thus, the first support column 101 to the fourth support column 104 support the case 3 from inside the case 3.

That is, since the tip end parts of the first support column 101 to the fourth support column 104 abut on the inner surface of the case 3, it is possible to suppress deformation of the case 3 in the direction of the optical axis L (deformation in a direction of the case 3 approaching the base member 100). Further, the surfaces facing outward, of the first support column 101 to the fourth support column 104, abut on the inner surface of the case 3, which enables suppression of the deformation of the case 3 in the X-axis direction and the Y-axis direction.

The present embodiment is configured as described above. In this lens driving device 1, the second support column 102 configured to limit the moving range of the X-axis movable element 200 abuts on the case 3 covering the base member 100. That is, the second support column 102 serves both as a function of regulating the moving range of the X-axis movable element 200, and as a function of receiving an external impact. Therefore, when an external impact is applied to the case 3, the impact is received by the second support column 102 abutting on the case 3. This can suppress deformation of the case 3. In addition, since the second support column 102 receives the impact, the external impact is not directly applied to the X-axis movable element 200 or the like. This eliminates transmission of the external impact via the X-axis movable element 200 to the X-axis piezoelectric actuator 130 and the like configured to move the X-axis movable element 200, and can suppress deformation of the X-axis piezoelectric actuator 130 and the like. Therefore, even when an external impact is applied to the case 3, the X-axis movable element 200 and the like can be stably moved by the X-axis piezoelectric actuator 130 and the like. Thus, the lens driving device 1 is capable of achieving a stable movement with resistance to external impacts.

When the projections 102a and 102b are provided on the second support column 102, a rotation of the X-axis movable element 200 with the axis along the optical axis L as the rotation axis can be regulated with the projections 102a and 102b. In addition, since the projections 102a and 102b of the second support column 102 also function to regulate the rotation of the X-axis movable element 200, it is possible to regulate the rotation of the X-axis movable element 200 with a simple configuration without adding another member to regulate the rotation of the X-axis movable element 200.

The lens driving part 2 has the third support column 103 fitted into the escape portion 203 of the X-axis movable element 200, and the fourth support column 104 fitted into the escape portion 204 of the X-axis movable element 200. In this case, a rotation of the X-axis movable element 200 can be regulated by the third support column 103 and the fourth support column 104.

Further, the X-axis piezoelectric actuator 130 is fixed to the first support column 101 abutting on the inner surface of the case 3. In this case, it is possible to provide a function of fixing the X-axis piezoelectric actuator 130, to the first support column 101 having a function of suppressing deformation of the case 3. This can simplify a configuration for fixing the X-axis piezoelectric actuator 130. Further, since the first support column 101 to the fourth support column 104 abut on the case 3, it is possible to further suppress deformation of the case 3 when an external impact is applied.

Although the embodiment of the present disclosure has been described above, the present disclosure is not limited to the above embodiment. For example, instead of the first support column 101, the X-axis piezoelectric actuator 130 configured to move the X-axis movable element 200 may be fixed to the second support column 102. In this case, since the second support column 102 also functions to fix the X-axis piezoelectric actuator 130, it is possible to fix the X-axis piezoelectric actuator 130 with a simple configuration without adding another member to fix the X-axis piezoelectric actuator 130.

Further, instead of the first support column 101, the X-axis piezoelectric actuator 130 configured to move the X-axis movable element 200 may be fixed to the third support column 103 or the fourth support column 104. In this case, since the third support column 103 or the fourth support column 104 configured to regulate a rotation of the X-axis movable element 200 also functions to fix the X-axis piezoelectric actuator 130, it is possible to fix the X-axis piezoelectric actuator 130 with a simple configuration without adding another member to fix the X-axis piezoelectric actuator 130.

In the embodiment, the first support column 101 to the fourth support column 104 are used as support columns abutting the inner surface of the case 3, but the number of the support columns is not limited to four.

What is claimed is:

1. A lens driving device for driving a lens, comprising:
   a base member;
   a movable element arranged to be stacked on the base member in a direction of an optical axis of the lens, and movable with respect to the base member;
   a piezoelectric actuator having a piezoelectric element, and configured to move the movable element in a direction orthogonal to the direction of the optical axis of the lens by expanding and contracting the piezoelectric element;
   a lens carrier arranged to be stacked on the movable element, on an opposite side to a side provided with the base member, in the direction of the optical axis of the lens, the lens carrier being capable of holding the lens;
   a first column portion rising from the base member toward a movable element side, and configured to limit a moving range of the movable element moved by the piezoelectric actuator; and
   a case covering the base member so as to accommodate the movable element, the piezoelectric actuator, the lens carrier, and the column portion,
   wherein the first column portion abuts on an inner surface of the case.

2. The lens driving device according to claim 1, wherein, the first column portion regulates a rotation of the movable element around an axis along the direction of the optical axis of the lens as a rotation axis.

3. The lens driving device according to claim 1, wherein, a first end part of the piezoelectric actuator is fixed to the first column portion, and a second end part is engaged with the movable element to move the movable element.

4. The lens driving device according to claim 1, further comprising a second column portion rising from the base member toward the movable element side, and configured to regulate a rotation of the movable element around an axis along the direction of the optical axis of the lens as a rotation axis,
   wherein the second column portion abuts on the inner surface of the case.

5. The lens driving device according to claim 4, wherein a first end part of the piezoelectric actuator is fixed to the second column portion, and a second end part is engaged with the movable element to move the movable element.

6. The lens driving device according to claim 1, further comprising a third column portion rising from the base member toward the movable element side, and abutting on the inner surface of the case,
   wherein a first end part of the piezoelectric actuator is fixed to the third column portion, and a second end part is engaged with the movable element to move the movable element.

* * * * *